C. O. PIETZSCH,
DRAFT ATTACHMENT FOR AUTOMOBILES.
APPLICATION FILED MAY 1, 1917.
1,258,807.
Patented Mar. 12, 1918.
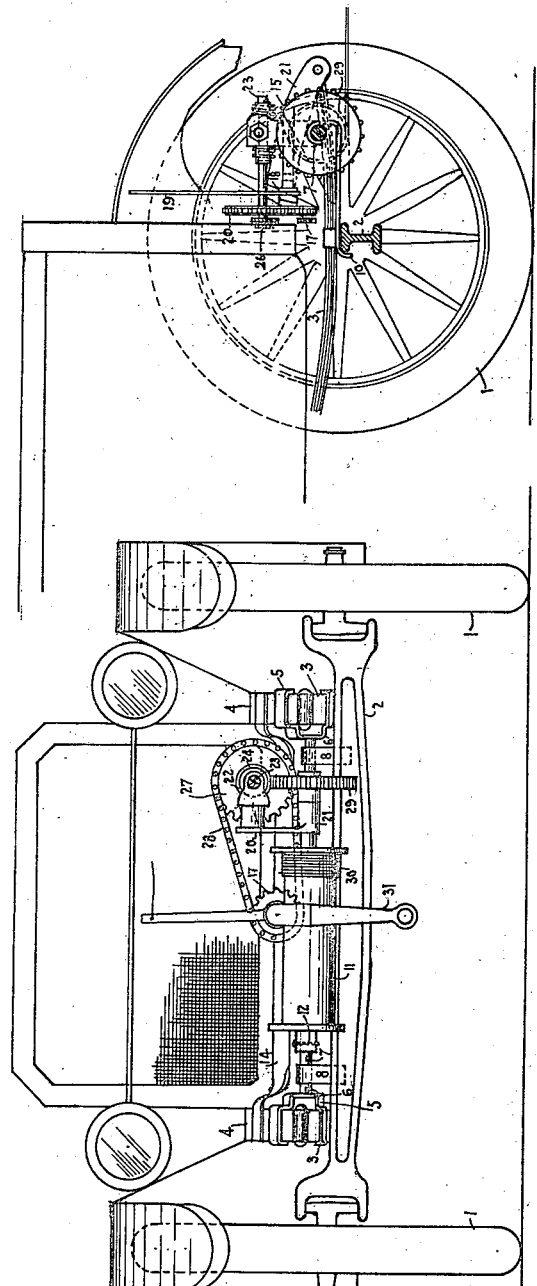
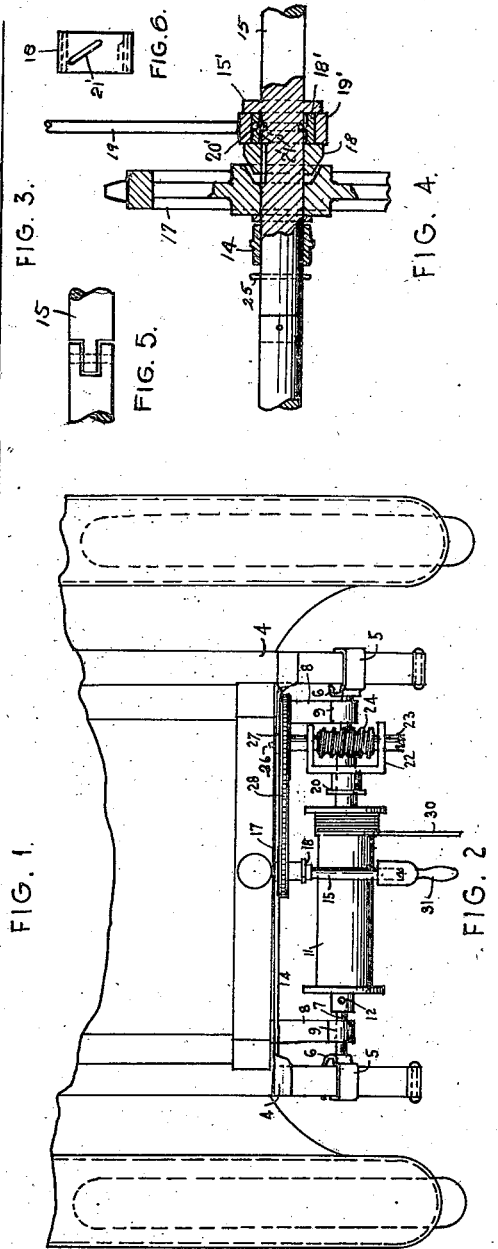
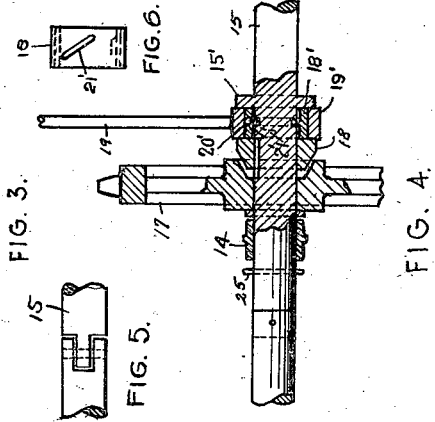
INVENTOR.
Cornelius O. Pietzsch
BY
Hardway Carlung
ATTORNEYS.

UNITED STATES PATENT OFFICE.

CORNELIUS O. PIETZSCH, OF EAST BERNARD, TEXAS.

DRAFT ATTACHMENT FOR AUTOMOBILES.

1,258,807.   Specification of Letters Patent.   Patented Mar. 12, 1918.

Application filed May 1, 1917. Serial No. 165,708.

*To all whom it may concern:*

Be it known that I, CORNELIUS O. PIETZSCH, a citizen of the United States, residing at East Bernard, in the county of Wharton and State of Texas, have invented certain new and useful Improvements in Draft Attachments for Automobiles, of which the following is a specification.

This invention relates to new and useful improvements in a draft attachment for automobiles.

The object of the invention is to provide an attachment of the character described whereby a motor vehicle which becomes stalled by reason of soft, muddy or slippery roads may be enabled to move itself by a positive pulling force independent of, or in conjunction with the traction between the drive wheels and the road surface.

Another object of the invention resides in the provision of a draft attachment which may be utilized for the purposes above set forth for pulling the vehicle forward and backward and which may be either manually driven or driven from the vehicle motor.

A further feature of the invention resides in the provision of a draft attachment which may be easily applied to and detached from the front part of a motor vehicle.

With the above and other objects in view, the invention has particular relation to certain novel features of construction, operation and arrangement of parts an example of which is given in this specification and illustrated in the accompanying drawings, wherein:

Figure 1 is a front view of an automobile, showing the attachment fixed thereto.

Fig. 2 is a plan view of the front end of said vehicle.

Fig. 3 is a sectional side view of the front end of the vehicle showing the attachment in its relation thereto, and Fig. 4 is a fragmentary sectional view of a clutch employed.

Fig. 5 is a fragmentary plan view showing the connection of the drum shaft with the shaft driven thereby.

Fig. 6 shows a plan view of the clutch collar employed.

Referring now more particularly to the drawings wherein like numerals of reference designate similar parts in each of the figures, the numerals 1, 1, refer to the front wheels of the vehicle which support the front axle 2. Secured to said front axle are the front vehicle springs 3, 3, which in turn support the forward ends of the side members 4, 4, of the vehicle frame. A pair of clips 5, 5, are provided which clip around the forward ends of the side members 4 and the corresponding springs 3 as shown in Figs. 1 and 2, said clips being provided with bearings 6, 6, wherein the respective ends of the transverse shaft 7 rotate. These clips 5 and the shaft 7 are secured against detachment by means of the tie bars 8, 8, whose front ends are formed into open bearings 9, 9, which receive said rod 7 and whose opposite ends are turned downwardly forming the shoulders 10 which engage over the front axle 2 as shown in Fig. 3.

A drum 11 is loosely mounted on the shaft 7 but may be secured to the shaft so as to rotate therewith by means of the pin 12 which passes through alined orifices in the hub of the drum and said shaft. A metallic bar 14 is provided whose ends are formed to rest upon the respective side members 4, 4. This bar has a central bearing to receive the shaft 15 which may be inserted therethrough and whose inner end is formed to connect with the front end of the engine shaft 16. Loosely mounted upon the shaft 15 is the sprocket wheel 17 which fits closely against the front side of the bar 14 and which may be clutched with said shaft or declutched therefrom by means of the clutch member 18. This member is splined on the shaft 15 and is conical in form to engage in a correspondingly shaped socket in the hub of the sprocket wheel 17. The shaft 15 has an annular bearing 15' integral therewith and spaced from the member 18 and interposed between said member and bearing and surrounding said shaft is a clutch collar 18'. A manual lever 19 is provided, the lower end of which is formed into a collar 19' which fits loosely around said clutch collar and is provided with a finger 20' which projects into a spiral shaped groove 21' carried by the clutch collar. A lateral pull of the lever 19 will operate to engage the clutch member 18 in the opposing socket which will force the sprocket wheel to rotate with the shaft 15, the finger 20' operating against the sloping side of the groove 21' to cause a relative backward movement of the collar 19. When the lever is released the clutch collar will ordinarily disengage. The friction between the shaft 15 and the clutch collar 18' will cause said collar to rotate and when the lever 19 is released the sloping side of the groove 21' will operate against the finger 20' to force the collar 19' back away from contact with the member 18, a very slight pressure being required for this purpose, so as to insure the disengagement of the clutch. However, any suitable form of clutch may be employed as no claim is made to the form of clutch shown. The numeral 20 refers to an upstanding arm, whose lower end is formed into a bearing 21 to receive the shaft 7, said arm being supported by said shaft. The upper end of this arm has two laterally extending bearings 22, 22, spaced apart which receive the shaft 23 and between which is the spur gear 24 which is fixed on said shaft. The inner end of the shaft 23 rotates in an alined bearing in the transverse bar 14 and said shafts 15 and 23 are secured against detachment by means of the corresponding cotter keys 25 and 26. Fixed upon the shaft 23 and in alinement with the sprocket wheel 17 is the sprocket wheel 27 and operating over said respective sprocket wheels is the sprocket chain 28. Fixed upon the shaft 7 is the gear wheel 29 in mesh with and driven by the worm gear 24.

A cable 30 is wound around the drum 11 and in case the machine becomes stalled, the free end of this cable may be attached to a stake or to any other stationary object, the drum 11 turning freely upon the shaft 7 for the purpose of facilitating the unwinding of said cable. The pin 12 is then inserted to lock the drum relative to its shaft. The engine is then started, either through the medium of the ordinary self starter or through the medium of the crank 31, in the well known manner. The clutch 18 is then engaged and the rotation of the sprocket wheel 17 will be imparted to the sprocket wheel 27 through the sprocket chain 28. It is obvious that the shafts 15 and 23 may be operatively connected by a belt or by spur gear wheels instead of through the sprocket wheels and a sprocket chain as shown, if desired. Rotation is imparted from the sprocket wheel 27 through the shaft 23 and the intermeshing gears 24 and 29 to the shaft 7 and the drum 11. As the drum rotates, the cable 30 will be wound up and the vehicle pulled forward. At the same time the engine may be operatively connected with the traction wheels to assist in the movement of the vehicle. The crank 31 is detachable and may be applied to the outer end of the shaft 23 and this shaft may be manually turned which will operate through the mechanism just described to pull the machine forward.

In the same manner, the machine may be moved rearwardly by attaching the free end of the cable 30 to a stationary object behind the vehicle.

It is obvious that the attachment may be readily removed by first removing the tie bars 8, 8, and then detaching the clamps 5 and the cross bar 14.

When properly constructed, this attachment will be comparatively light and compact and may be readily carried in the vehicle body for ready use in case of emergency.

What I claim is:

1. A draft attachment for motor vehicles, including a transverse shaft, detachable bearings carried by the side members of the vehicle frame, wherein the respective ends of the shaft rotate, tie bars whose forward ends are provided with bearings to receive said shaft and whose opposite ends engage with the vehicle axle, a drum carried by said shaft, a cable wound around the drum and having one end free and adapted to be attached to a stationary object and a mechanism in operative connection with the shaft and through which said shaft may be rotated.

2. A draft attachment for motor vehicles including detachable bearings carried by the side members of the vehicle frame, a rotatable shaft mounted in said bearings, tie bars having bearings wherein the shaft rotates, said bars being detachably secured to the vehicle axle, a drum carried by the shaft, a cable one end of which is wound around the drum and the other end of which is free and adapted to be attached to a stationary object and means for operatively connecting the drum, with and disconnecting it from the vehicle motor.

In testimony whereof I have signed my name to this specification in the presence of two subscribing witnesses.

CORNELIUS O. PIETZSCH.

Witnesses:
 E. V. HARDWAY,
 FLORENCE JOHNSTON.